(12) United States Patent
Ding et al.

(10) Patent No.: US 11,237,854 B2
(45) Date of Patent: Feb. 1, 2022

(54) PROVIDING A VIRTUAL DESKTOP WITHIN A COMPUTING ENVIRONMENT

(71) Applicant: Citrix Systems, Inc., Fort Lauderdale, FL (US)

(72) Inventors: Debao Ding, Nanjing (CN); Qianqian Zu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/322,304

(22) PCT Filed: Oct. 22, 2018

(86) PCT No.: PCT/CN2018/111203
§ 371 (c)(1),
(2) Date: Jan. 31, 2019

(87) PCT Pub. No.: WO2020/082210
PCT Pub. Date: Apr. 30, 2020

(65) Prior Publication Data
US 2021/0334119 A1    Oct. 28, 2021

(51) Int. Cl.
*G06F 3/048* (2013.01)
*G06F 9/451* (2018.01)
*H04L 29/06* (2006.01)

(52) U.S. Cl.
CPC .......... *G06F 9/452* (2018.02); *H04L 65/1069* (2013.01); *H04L 65/4069* (2013.01)

(58) Field of Classification Search
None
See application file for complete search history.

(56) References Cited

U.S. PATENT DOCUMENTS

| 8,890,925 B2 | 11/2014 | Weiser et al. |
| 8,994,778 B2 | 3/2015 | Weiser |
| 9,817,627 B2 | 11/2017 | Kreiner et al. |
| 10,108,389 B2 | 10/2018 | Kreiner et al. |

(Continued)

FOREIGN PATENT DOCUMENTS

| CN | 104915171 | 9/2015 |
| CN | 105656749 | 6/2016 |
| CN | 106713485 | 5/2017 |

*Primary Examiner* — Tuan S Nguyen
(74) *Attorney, Agent, or Firm* — BainwoodHuang (57) ABSTRACT

A technique provides a virtual desktop. The technique involves receiving device identification information via a browser operating on display equipment. The device identification information identifies a mobile computing device. The technique further involves creating a communications pathway between the display equipment and the mobile computing device based on the device identification information. The technique further involves, while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment.

20 Claims, 6 Drawing Sheets

(56) References Cited

U.S. PATENT DOCUMENTS

| | | |
|---|---|---|
| 10,242,714 B2 | 3/2019 | Roy et al. |
| 10,244,200 B2 | 3/2019 | Wozniak et al. |
| 10,244,215 B2 | 3/2019 | Wozniak et al. |
| 10,347,293 B1 | 7/2019 | Skinner et al. |
| 10,372,403 B2 | 8/2019 | Marquardt et al. |
| 10,574,955 B2 | 2/2020 | Wozniak et al. |
| 10,592,195 B2 | 3/2020 | Kreiner et al. |
| 10,705,690 B1 * | 7/2020 | Mehta ................. H04L 12/1822 |
| 10,776,069 B2 | 9/2020 | Marquardt et al. |
| 10,846,573 B2 | 11/2020 | Skinner et al. |
| 2013/0166629 A1 * | 6/2013 | Ivashin ................... H04L 67/42 709/203 |
| 2014/0189138 A1 | 7/2014 | Summers |
| 2017/0279898 A1 | 9/2017 | Yang et al. |
| 2018/0089940 A1 * | 3/2018 | Petersen ............. G07F 17/3258 |
| 2018/0241609 A1 | 8/2018 | Rombakh et al. |
| 2020/0403811 A1 | 12/2020 | Pavlou |

\* cited by examiner

PROVIDING A VIRTUAL DESKTOP WITHIN A COMPUTING ENVIRONMENT

BACKGROUND

A user runs a virtual desktop client on a user device to access to a virtual desktop provided by a virtual desktop server. The virtual desktop may include a variety of virtual desktop applications such as a document editor, an email client, a web browser, and so on.

Before the virtual desktop server provides the virtual desktop to the user device, the user device communicates the resolution of the user device's monitor to the virtual desktop server. Such communication enables the virtual desktop server to provide virtual desktop graphics which are correctly sized for proper display on the user device.

SUMMARY

Improved techniques are directed to providing a virtual desktop on display equipment (e.g., a desktop computer, a smart television, a smart projection system for a conference room, etc.) which runs a browser that loads a set of specialized web pages. As the set of specialized web pages is loaded, the display equipment creates a communications channel with a mobile computing device (e.g., a tablet, a smart phone, a laptop, etc.) that has already launched a virtual desktop. The display equipment and the mobile computing device then coordinate their operation through the communications channel to enable that virtual desktop to be "casted" to the display equipment from the mobile computing device. Such operation enables user input such as keyboard events and physical mouse events occurring on the display equipment to be redirected as input to the virtual desktop launched on the mobile computing device, and for the virtual desktop graphics stream to be conveyed to the display equipment from the mobile computing device for display by the display equipment. Furthermore, the mobile computing device can communicate the resolution of the screen of the display equipment to the virtual desktop server that hosts the virtual desktop so that the virtual desktop server sizes the virtual desktop graphics stream for proper display by the display equipment.

It should be understood that the term "casting" of a virtual desktop, as used herein, refers to projecting the virtual desktop from one device on which the virtual desktop is launched (e.g., a virtual desktop client device) to another device (e.g., display equipment). Moreover, user input may be entered onto the display equipment to remotely control the virtual desktop from the display equipment (e.g., where the virtual desktop client device then relays the user input to the virtual desktop server that hosts the virtual desktop).

One embodiment is directed to a method of providing a virtual desktop. The method includes receiving device identification information via a browser operating on display equipment. The device identification information identifies a mobile computing device. The method further includes creating a communications pathway between the display equipment and the mobile computing device based on the device identification information. The method further includes, while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment.

In some arrangements, the display equipment includes an electronic screen and control circuitry that runs the browser to display a browser window on the electronic screen. Additionally, communicating over the communications pathway created between the display equipment and the mobile computing device includes receiving a virtual desktop graphics stream from the mobile computing device and rendering the virtual desktop graphics stream within the browser window displayed on the electronic screen.

In some arrangements, the display equipment further includes a keyboard and a physical mouse coupled to the control circuitry. Additionally, communicating over the communications pathway created between the display equipment and the mobile computing device further includes sending keyboard events and mouse events captured by the control circuitry that runs the browser from the display equipment to the mobile computing device over the communications pathway.

In some arrangements, receiving the virtual desktop graphics stream from the mobile computing device and rendering the virtual desktop graphics stream within the browser window displayed on the electronic screen includes, while the keyboard events and mouse events are sent by the control circuitry, displaying different desktop images within the browser window on the electronic screen to depict operation of the virtual desktop. Such operation is in response to (i) the mobile computing device conveying the keyboard events and mouse events to the virtual desktop server, (ii) the virtual desktop server generating the different desktop images based on the keyboard events and mouse events and sending the different desktop images to the mobile computing device, and (iii) the mobile computing device conveying the different desktop images to the display equipment.

In some arrangements, the method further includes sending a screen resolution for the electronic screen of the display equipment from the display equipment to the mobile computing device for conveyance to the virtual desktop server to enable the virtual desktop server to match a resolution of the different desktop images to the screen resolution for the electronic screen of the display equipment.

In some arrangements, the mobile computing device includes a touchscreen having a touchscreen resolution. Additionally, prior to sending the screen resolution for the electronic screen of the display equipment, the virtual desktop server provides a first set of desktop images having the touchscreen resolution. Furthermore, sending the screen resolution for the electronic screen of the display equipment includes causing the virtual desktop server to provide a second set of desktop images having the screen resolution in place of the first set of desktop images having the touchscreen resolution.

In some arrangements, sending the keyboard events and the mouse events captured by the control circuitry that runs the browser from the display equipment to the mobile computing device over the communications pathway includes redirecting keyboard events and mouse events which are detected within the browser window to the mobile computing device.

In some arrangements, receiving the virtual desktop graphics stream from the mobile computing device and rendering the virtual desktop graphics stream within the browser window displayed on the electronic screen includes displaying user activity within the browser window while the keyboard events and the mouse events which are detected within the browser window are redirected to the mobile computing device.

In some arrangements, receiving the device identification information via the browser operating on the display equipment includes loading a first web page that includes a discovery script, and running the discovery script to obtain the device identification information identifying the mobile computing device.

In some arrangements, the device identification information includes a network address that uniquely identifies the mobile computing device on a computer network. Additionally, running the discovery script to obtain the device identification information identifying the mobile computing device includes acquiring the network address from the mobile computing device in a wireless manner.

In some arrangements, acquiring the network address from the mobile computing device in the wireless manner includes capturing an image displayed on a touchscreen of the mobile computing device using a camera of the display equipment, and deriving the network address from the captured image displayed on the touchscreen of the mobile computing device.

In some arrangements, creating the communications pathway between the display equipment and the mobile computing device includes performing a websocket operation that enables the browser operating on the display equipment to establish websocket communications between the browser operating on the display equipment and the mobile computing device.

In some arrangements, the method further includes, after creating the communications pathway between the display equipment and the mobile computing device, loading a second web page in place of the first web page, the second web page including a rendering script.

In some arrangements, receiving the virtual desktop graphics stream from the mobile computing device and rendering the virtual desktop graphics stream within the browser window displayed on the electronic screen includes, in accordance with the rendering script of the second web page, displaying different desktop images generated by the virtual desktop server in the browser window displayed on the electronic screen.

In some arrangements, displaying the different desktop images generated by the virtual desktop server in the browser window displayed on the electronic screen includes decoding the virtual desktop graphics stream to render the different desktop images within the second web page while the electronic screen of the display equipment is recognized as an extended screen by the mobile computing device.

In some arrangements, the display equipment is a desktop computer. Additionally, the method further includes, prior to receiving the device identification information, configuring the desktop computer to support HTML5 markup language.

In some arrangements, the display equipment is a smart television. Additionally, the method further includes, prior to receiving the device identification information, configuring the smart television to support HTML5 markup language.

In some arrangements, the display equipment is a smart projection system. Additionally, the method further includes, prior to receiving the device identification information, configuring the smart projection system to support HTML5 markup language.

Another embodiment is directed to display equipment which includes a communications interface constructed and arranged to connect to a computer network, memory, and control circuitry coupled to the communications interface and the memory. The memory stores instructions that, when carried out by the control circuitry, cause the control circuitry to:

(A) receive device identification information via a browser operating on the display equipment, the device identification information identifying a mobile computing device;
(B) based on the device identification information, creating a communications pathway between the display equipment and the mobile computing device through the communications interface; and
(C) while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment.

Yet another embodiment is directed to a computer program product having a non-transitory computer readable medium that stores a set of instructions to provide a virtual desktop. The set of instructions, when carried out by display equipment, cause the display equipment to perform a method of:

(A) receiving device identification information via a browser operating on display equipment, the device identification information identifying a mobile computing device;
(B) based on the device identification information, creating a communications pathway between the display equipment and the mobile computing device; and
(C) while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved providing a virtual desktop.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing a virtual desktop on display equipment which runs a browser that loads a set of specialized web pages (e.g., a set of web pages having scripts to project a virtual desktop to the display equipment). When the set of specialized web pages loads, the display equipment creates a communications channel with a mobile computing device that has already launched a virtual desktop. The display equipment and the mobile computing device coordinate their operation through the communications channel to enable that virtual desktop to be "casted" to the display equipment from the mobile computing device. Such operation enables user input such as keyboard events and physical mouse events occurring on the display equipment to be redirected as input to the virtual desktop launched on the mobile computing device, and for the virtual desktop graphics stream to be conveyed to the display equipment from the mobile computing device for display by the display equipment.

The screen size of the mobile computing device may be different from the screen size of the display equipment. However, the mobile computing device can communicate the resolution of the screen of the display equipment to the virtual desktop server that hosts the virtual desktop so that the virtual desktop graphics stream is sized for proper display by the display equipment (i.e., the virtual desktop graphics stream is then sized for the display equipment even though the virtual desktop is launched on the mobile computing device).

Additionally, since the mobile computing device already has launched the virtual desktop, the user does not need to establish a virtual desktop session using the display equipment. Accordingly, any sensitive data that is normally used to establish the virtual desktop session is not exposed to the display equipment.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
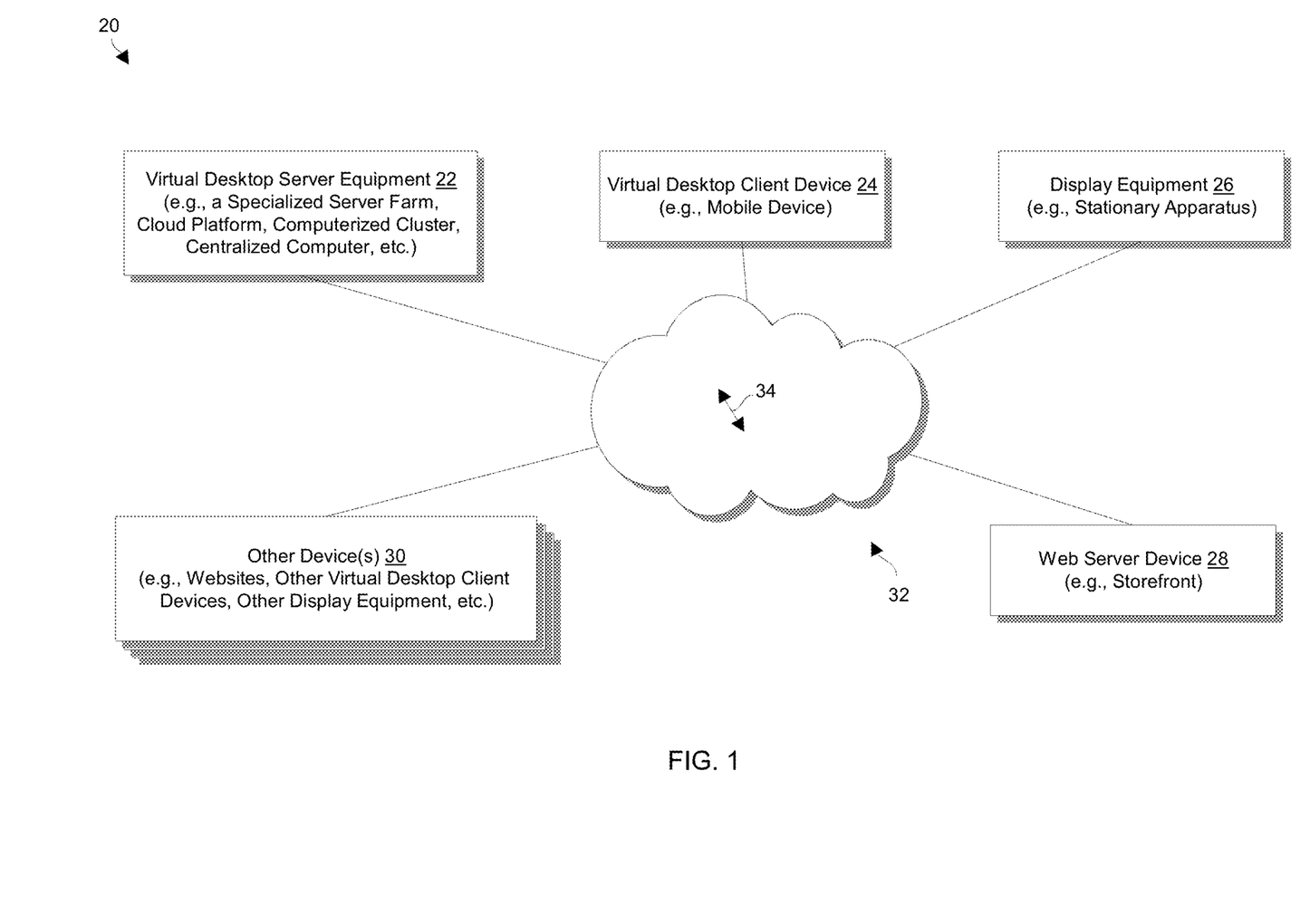
FIG. 1 is a block diagram of an example computing environment which enables virtual desktop casting from one device to another device in accordance with certain embodiments.

FIG. 1 shows, in accordance with certain embodiments, an example computing environment 20 that employs a virtual desktop infrastructure (VDI) and enables virtual desktop casting from one device to another device. The computing environment 20 includes virtual desktop server equipment 22, a virtual desktop client device 24 (hereinafter, the client device 24), display equipment 26, a web server device 28, other devices 30, and a communications medium 32.

The virtual desktop server equipment 22 is constructed and arranged to host virtual desktops to various virtual desktop client devices. Suitable equipment for the virtual desktop server equipment 22 includes a centralized computer, a computerized cluster, a specialized server farm, other data center types of equipment, a cloud platform, etc. Such equipment may reside in one or more central locations (e.g., a single campus, a building, etc.), be distributed among different locations (e.g., different cities, states, coasts, etc.), or combinations thereof.

The client device 24 is constructed and arranged to establish a virtual desktop session with the virtual desktop server equipment 22. That is, the client device 24 runs virtual desktop client software to provide a virtual desktop that is hosted by the virtual desktop server equipment 22. Once a virtual desktop is launched on the client device 24, a user is able to perform useful work (e.g., access files/messages/emails/other data/etc., run other applications, consume or provide electronic services, generate/edit/output content, etc.). Suitable electronic apparatus for the client device 24 include mobile devices such as a tablet, a smart phone, a portable laptop, and the like. In the context of a mobile device, the user is able to carry the client device 24 to different locations (e.g., to attend meetings, to perform useful work while on the road, etc.) but continue to access and operate the virtual desktop from the different locations.

The display equipment 26 is constructed and arranged to operate as a satellite platform onto which the client device 24 casts the virtual desktop. Suitable electronic apparatus for the display equipment 26 include computerized devices (e.g., control circuitry and an electronic display) that are provisioned with browser applications to load specialized webpages. In the context of a stationary apparatus having a larger screen than that of the client device 24, the user is able to cast the virtual desktop from the client device 24 to the display equipment 26 to enable the user to remotely and more effectively view and/or operate the virtual desktop from the display equipment 26. Suitable equipment having larger screens include a desktop workstation (e.g., at a café or in a guest office), a smart television (e.g., in a conference room), a computerized audio/visual projection system (e.g., in an auditorium), and the like.

The web server device 28 is constructed and arranged to provide specialized web pages to the display equipment 26. As will be explained in further detail shortly, the specialized web pages include scripts that enable the display equipment 26 to create a communications channel with the client device 24, identify a resolution for an electronic screen, and effectuate casting of a virtual desk from the client device 24 to the display equipment 26. During such casting of the virtual desktop from the client device 24 to the display equipment 26, the display equipment 26 receives and renders a virtual desktop graphics stream for the virtual desktop, as well as redirects user input events such as keyboard input and physical mouse input to control the virtual desktop. In some arrangements, the web server device 28 is configured as a storefront that provides an interface (e.g., a storefront web site) for users to access a variety of applications (e.g., virtual desktop client software, software to access other hosted virtualization services, other enterprise applications, and so on).

The other devices 30 represent other equipment that resides within the computing environment 20. Such other equipment may include other virtual desktop client devices 24, other display equipment 26, other servers (e.g., email servers, file servers, database servers, websites, other equipment that provides services and/or content for virtual desktops, etc.), and so on.

The communications medium 32 is constructed and arranged to connect the various components of the computing environment 20 together to enable these components to exchange electronic signals 34 (e.g., see the double arrow 34). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, etc. Furthermore, the communications medium 32 is capable of supporting a variety of communications types such as Ethernet-based communications, cellular communications, plain old telephone service (POTS) communications, combinations thereof, and so on.

In some situations, at least a portion of the computing environment 20 utilizes a virtualization platform that runs virtual machines (VMs) for scalability, load balancing, fault tolerance, and so on. In some arrangements, the virtual desktop server equipment 22 and the web server device 28 are co-located in a data center (e.g., hosted on one or more data center servers) and are able to utilize the virtualization platform.

During operation of the computing environment 20, a user operates the client device 24 to establish a virtual desktop session with the virtual desktop server equipment 22. Once the virtual desktop session is established, the user is able to utilize a virtual desktop hosted by the virtual desktop server equipment 22. That is, on a display of the client device 24, the user views virtual desktop images of a virtual desktop graphics stream provided by the virtual desktop server equipment 22. Additionally, the user is able to enter user input (e.g., text, screen coordinates, etc.) to control the virtual desktop and perform useful work.

In arrangements in which the client device 24 is a mobile device (e.g., a smart phone, a tablet, a laptop, etc.), the user is able to carry the client device 24 and perform work at various different locations (e.g., at the office, at home, in a public area such as a café, in another company's venue, etc.). Moreover, since the user maintains possession of the client device 24 while carrying the client device 24 from place to place, there is stronger security compared to the user authenticating on various unknown devices at the different locations (e.g., authentication factors are entered into the user's mobile device and thus the user does not need to worry about personal information leak due to authentication on an unknown device).

At some point after the user has launched the virtual desktop on the client device 24, the user accesses the display equipment 26 which has components that the user prefers operating over continuing to use the client device 24. For example, the user may be in a guest office, a library, a café, etc. which is equipped with the display equipment 26. In such a situation, the display equipment 26 may offer the user a larger screen, a keyboard, a mouse, a webcam, and so on.

On the display equipment 26, the user launches a browser which is equipped to load a set of specialized web pages from the web server device 28. In some arrangements, the browser supports HTML5 web pages which utilize a pre-defined structure, cascading style sheets (CSS), and Javascript. Here, it should be understood that there is no need to pre-install specialized software or configuration/settings on the display equipment 26. Rather, the display equipment 26 simply provides the user with access to a browser that supports HTML5.

The user then navigates the browser on the display equipment 26 to a network location on the web server device 28 (e.g., a URL or link) to load the set of specialized web pages. When the browser loads the set of specialized web pages, the browser sequences through a series of operations that enables casting of the virtual desktop from the client device 24 to the display equipment 26 and remotely operating the virtual desktop from the display equipment 26.

In some arrangements, the web server device 28 presents access to the set of specialized web pages in the form of a storefront from which the user can simply retrieve an initial web page that then sequences the user through a series of operations that casts the virtual desktop from the client device 24 to the display equipment 26. Along these lines, the user may pair the client device 24 and the display equipment 26 by displaying a unique identifier on the screen of the client device 24 and capturing an image of the unique identifier using a camera of the display equipment 26 (e.g., activating the camera to take a picture of a QR code displayed on the screen of the mobile device).

In response, the display equipment 26 creates a communications pathway to the client device 24, and the client device 24 then casts the virtual desktop to the extended screen device 26 through the communications pathway using the display equipment 26 as an extended screen of the client device 24.

Furthermore, during initial setup, the display equipment 26 may send the screen resolution of the display equipment's electronic screen to the client device 24 and the client device 24 may pass the screen resolution on to the virtual desktop server equipment 22 to enable the virtual desktop server equipment 22 to provide a virtual desktop graphics stream for the virtual desktop in the proper resolution for display on the display equipment's electronic screen.

Such operation results in effective casting of the virtual desktop from the client device 24 to the display equipment 26. That is, the client device 24 now projects the virtual desktop launched on the client device 24 to the display equipment 26 for display on the electronic screen of the display equipment 26. Additionally, the display equipment 26 redirects user input such as keyboard and mouse events to the client device 24. Accordingly, the user is able to perform useful work by directly interfacing with the display equipment 26 to remotely operate the virtual desktop on the client device 24.

Windows desktop or Linux desktop is well suited for the above-described virtual desktop casting scenario. Further details will now be provided with reference to FIG. 2.

Figure 2:
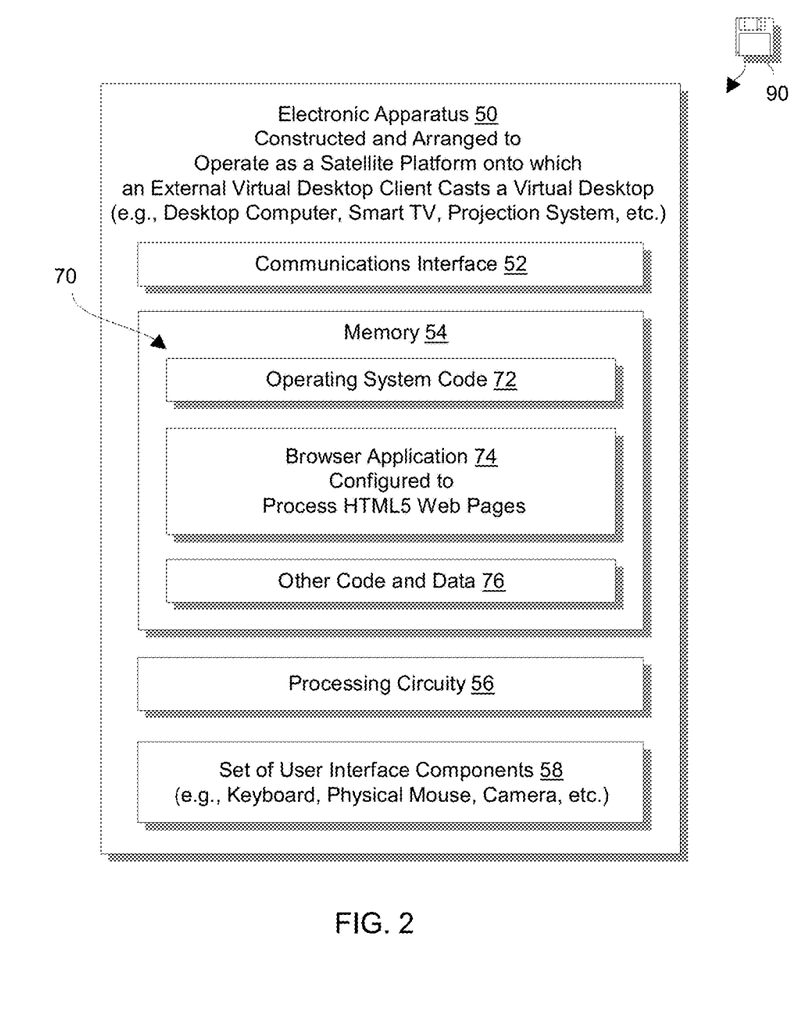
FIG. 2 is a block diagram of electronic equipment which is suitable for use within the computing environment of FIG. 1 in accordance with certain embodiments.

FIG. 2 shows an electronic apparatus 50 which is suitable for use as the display equipment 26 in accordance with certain embodiments (also see FIG. 1). The electronic apparatus 50 is constructed and arranged to operate as a satellite platform onto which an external virtual desktop client casts a virtual desktop. As shown in FIG. 2, the electronic apparatus 50 includes a communications interface 52, memory 54, and processing circuitry 56, and a set of user interface components 58.

The communications interface 52 is constructed and arranged to connect the electronic apparatus 50 to the communications medium 32 (FIG. 1). Accordingly, the communications interface 52 enables the electronic apparatus 50 to communicate with the other components of the computing environment 20. Such communications may be line-based, wireless, combinations thereof, and so on. Moreover such communications may utilize a variety of protocols (e.g., IP, cellular, fiber optic, RF, etc.).

The memory 54 is intended to represent both volatile storage (e.g., DRAM, SRAM, etc.) and non-volatile storage (e.g., flash memory, magnetic disk drives, etc.). The memory 54 stores a variety of software constructs 70 including an operating system 72, a browser application 74, and other code and data 76.

The processing circuitry 56 is constructed and arranged to operate in accordance with the various software constructs 70 stored in the memory 54. In particular, the processing circuitry 56, when executing the operating system 72, manages various resources of the electronic equipment 50 (e.g., memory allocation, processor cycles, hardware compatibility, etc.). Additionally, the processing circuitry 56, when operating in accordance with the browser application 74, is constructed and arranged to process specialized web pages such as HTML5 web pages which include scripts that are run locally to form specialized control circuitry. Furthermore, the processing circuitry 56, when operating in accordance with the other code and data 76, is constructed and arranged to perform other operations such as operate a camera, perform optical character recognition and/or bar code decoding, provide other user-level services, etc.

It should be understood that the above-mentioned processing circuitry 56 may be implemented in a variety of ways including one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 50. The computer program product 90 has a non-transitory and non-volatile computer readable medium that stores a set of instructions to control one or more operations of the electronic apparatus 50. Examples of suitable computer readable storage media include tangible articles of manufacture and apparatus that store instructions in a non-volatile manner such as CD-ROM, flash memory, disk memory, tape memory, and the like.

The set of user interface components 58 refers to various user input/output (I/O) componentry that enables a user to enter user input into the electronic apparatus 50, and/or obtain user output from the electronic apparatus 50. For example, the electronic apparatus 50 may include a keyboard to capture keystrokes (e.g., captured by the control circuitry of the electronic apparatus 50 as the user types on the keys of the keyboard), a physical mouse to receive pointer/curser coordinates (e.g., captured by the control circuitry of the electronic apparatus 50 as the user moves the physical mouse over a surface), a camera to capture visual images, and so on. Other componentry is suitable for use as well such as a microphone, a set of speakers, etc. Further details will now be provided with reference to FIG. 3.

Figure 3:
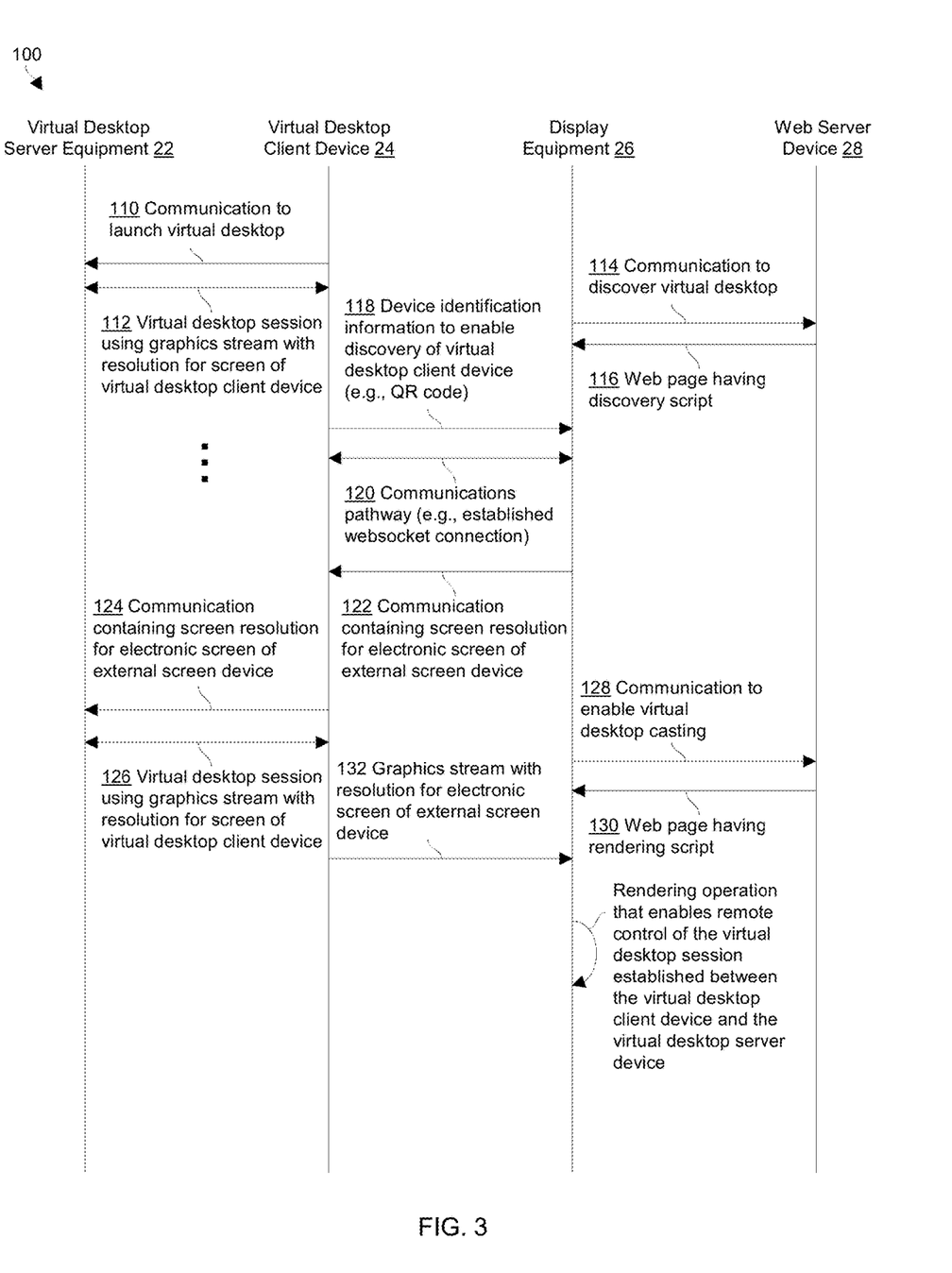
FIG. 3 is a sequence diagram showing particular operations and/or communications in accordance with certain embodiments.

FIG. 3 shows, in accordance with certain embodiments, a sequence diagram 100 for particular activities occurring within the computing environment 20 when casting a virtual desktop from a virtual desktop client device 24 to display equipment 26 (also see FIG. 1). As shown, the sequence diagram 100 shows involvement of the virtual desktop server equipment 22, the client device 24, the display equipment 26, and the web server device 28.

At 110, the user runs a virtual desktop client application on the client device 24 which in turn communicates with virtual desktop server equipment 22 to launch the virtual desktop. Along these lines, the virtual desktop server equipment 22 and the client device 24 may exchange a variety of information.

For example, the user may be prompted to input confidential data (e.g., a username, a password, etc.) into the client device 24 to authenticate. However, since user normally maintains control over the client device 24 (e.g., the client device 24 may be a mobile computing device that the user continues to possess), the confidential data remains protected.

Additionally, the client device 24 may send the screen resolution of the virtual desktop client device's screen to the virtual desktop server equipment 22. For example, the client device 24 may be a mobile computing device having a touchscreen. Accordingly, the virtual desktop server equipment 22 is able to properly size and prepare the virtual desktop graphics stream that the client device 24 then decodes and renders to provide the virtual desktop.

At 112, the virtual desktop server equipment 22 and the client device 24 continue to communicate in order to provide the virtual desktop session that enables the user to perform useful work (e.g., read/edit documents, receive and send email, access websites, etc.) using the client device 24. Examples include a Windows desktop session, a Linux desktop session, etc. Here, the client device 24 provides virtual desktop input (e.g., keyboard input, mouse input, etc.) to the virtual desktop server equipment 22 and, in response, the virtual desktop server equipment 22 provides virtual desktop output (e.g., a virtual desktop graphics stream) to the client device 24.

At 114, the display equipment 26 communicates with the web server device 28. In particular, recall that the display equipment 26 provides a browser which is equipped to load a set of specialized web pages from the web server device 28. Accordingly, the user navigates the browser to a particular specialized web page at the web server device 28. Along these lines, the user may enter a particular web address (e.g., a URL) into the browser, click on a particular link or icon, select an earlier-saved favorite, etc. In some arrangements, the browser supports HTML5 and the web pages are HTML5 web pages which include scripts that direct the display equipment 26 to perform specialized operations that will enable virtual desktop projection from a virtual desktop client to the display equipment 26.

At 116, the web server device 28 provides the specialized web page to the display equipment 26. The specialized web page includes (or retrieves) a discovery script (e.g., specialized instructions that are carried out by the browser) which the display equipment 26 runs when loading the specialized web page. As a result, the display equipment 26 is now configured to receive device identification information that identifies the client device 24 thus enabling the display equipment 26 to send messages directly to the client device 24. In some arrangements, the device identification information includes the network address of the client device 24 that enables the web server device 28 to identify and electronically communicate with the client device 24 over a computer network (also see the communications medium 32 in FIG. 1).

At 118, the client device 24 provides the device identification information to the display equipment 26. In some arrangements, the display equipment 26, when running the discovery script, is ready to wirelessly capture an image from the screen of the client device 24. The image may be a set of graphics (e.g., a QR code, a linear bar code, text, combinations thereof, etc.) containing the network address of the client device 24. In the context of a mobile computing device, the user may hold the screen of the mobile computing device in front of the camera of the display equipment 26 and capture the image (e.g., after pressing a button, after waiting through a countdown period, etc.).

It should be understood that a variety of other techniques are suitable for providing the network address of the client device 24 to the display equipment 26. For example, the user may manually type in the network address on a keyboard of the display equipment 26 while reading the network address from the screen of the client device 24. As another enable, the display equipment 26 and the client device 24 may initially discover and communicate with each other wirelessly using Bluetooth, RF, etc. in order to convey the network address, and so on.

At 120, the display equipment 26 now has the network address of the client device 24 and creates a communications pathway with the client device 24. In some arrangements, the client device 24 includes a websocket server (e.g., listens on a particular port number), and establishes a websocket connection with the display equipment 26 in response to an initial message from the display equipment 26.

At 122, in accordance with the discovery script, the display equipment 26 sends the screen resolution of the electronic screen of the display equipment 26 to the client device 24. Conveyance of the screen resolution as well as other information may occur through the communications pathway.

At 124, the client device 24 communicates the screen resolution to the virtual desktop server equipment 22 (also see the virtual desktop session 112 in FIG. 3) thus enabling the virtual desktop server equipment 22 to provide a new virtual desktop graphics stream in the proper screen resolution for the display equipment 26.

At 126, the virtual desktop server equipment 22 and the client device 24 continue to communicate in order to provide the virtual desktop session that enables the user to perform useful work. However, the client device 24 now provides a virtual desktop graphics stream having a resolution that matches the electronic screen of the display equipment 26 (e.g., in place of a resolution that matched the screen of the client device 24).

At 128, still in accordance with the discovery script, the display equipment 26 provides another communication to the web server device 28 requesting another specialized web page. In particular, the display equipment 26 is now ready to receive a specialized web page that enables rendering of a casted virtual desktop.

At 130, the web server device 28 provides the other specialized web page to the display equipment 26. This specialized web page includes a rendering script. Running the rendering script configures the display equipment 26 to await receipt of the virtual desktop graphics stream from the client device 24 through the communications pathway 120 to render virtual desktop images on the electronic screen of the display equipment 26. In some arrangements, the browser is now configured to decode/display images from the virtual desktop graphics stream as content within a region of a browser window or pane.

At 132, the client device 24 provides the virtual desktop graphics stream having the resolution that matches the electronic screen of the display equipment 26 to the display equipment 26. At this point, the user is ready to remotely access the virtual desktop that is launched on the client device 24 using the display equipment 26.

At 134, upon receipt of the virtual desktop graphics stream, the display equipment 26 decodes and renders the virtual desktop locally on the electronic screen. In particular, the virtual desktop images are displayed within a window of the browser which continues to run and operate in accordance with the rendering script.

Additionally, in accordance with some arrangements, the user is able to operate the virtual desktop displayed on the display equipment 26 by typing on a keyboard and moving a physical mouse (or similar pointing tool). Along these lines, the display equipment 26 captures keyboard events and physical mouse events and redirects these events to the client device 24 through the communications pathway 120 (rather than further process the events locally).

In some arrangements, while the browser is the current active application on the display equipment 26, the keyboard and mouse events are channeled to the client device 24 for use as virtual desktop input rather than further processed as browser input that would operate the browser. For example, when the user types on the keyboard, the keyboard input is not simply echoed on the browser window, but instead sent to the client device 24 to be processed as virtual desktop input. Similarly, mouse events over the browser window (e.g., movement of the pointer, clicking on a location, etc.) are not simply displayed on the browser window, but instead sent to the client device 24 to be processed as virtual desktop input.

Since the client device 24 receives these events and conveys them to the virtual desktop server equipment 22 as virtual desktop input (i.e., as if the events were provided by the user directly operating the client device 24). Accordingly, the user is able to remotely operate the virtual desktop which is still launched on the client device 24. Further details will now be provided with reference to FIG. 4.

Figure 4:
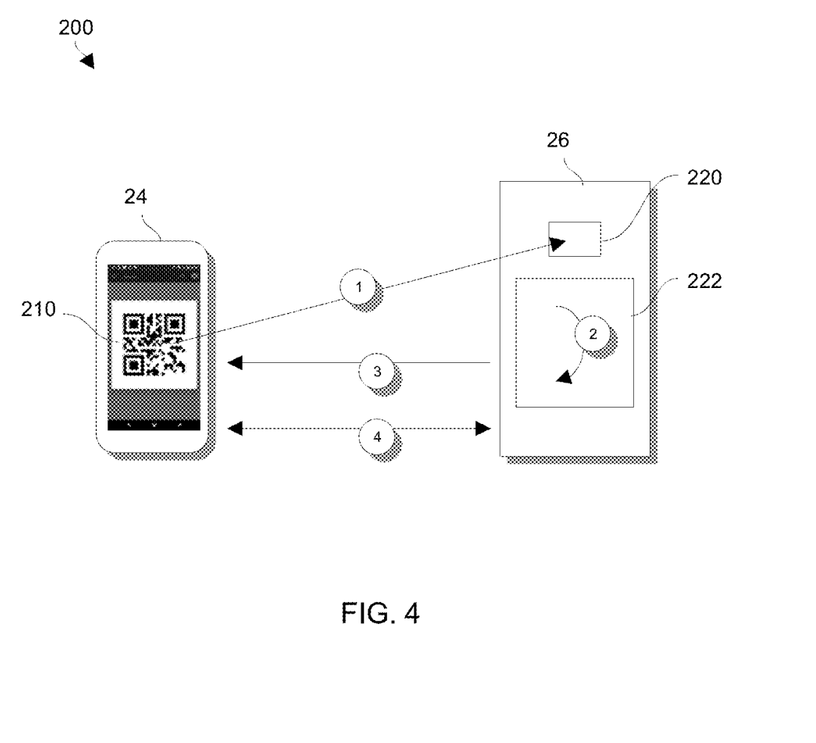
FIG. 4 is a block diagram of an example information exchange that occurs within the computing environment of FIG. 1 in accordance with certain embodiments.

FIG. 4 shows an example technique for wirelessly providing the device identification information to the display equipment 26 to create a communications channel between the client device 24 and the display equipment 26. Along these lines, recall that the client device 24 may be a mobile device (e.g., a tablet, a smart phone, a laptop, etc.) and the display equipment 26 may be stationary computing equipment with a larger screen, keyboard, mouse, etc. (e.g., a desktop computer, a smart television, a smart projection system, etc.). In such a situation, the user is able to hold and maneuver the client device 24 in front of the display equipment 26.

As shown in FIG. 4, the screen 210 of the client device 24 displays an image representing the device identification information that contains the network address of the client device 24. The image may represent the device identification information as a QR code, a linear bar code, recognizable text, combinations thereof, and so on.

Next, a camera 220 of the display equipment 26 captures the image (arrow 1). In particular, the user holds the client device 24 so that the screen 210 is aimed at the camera 220. The image may be captured in response to a button press, a timer counting down, automatic recognition of the device identification information, and so on.

Subsequently, processing circuitry 222 of the display equipment 26 derives the network address from the image (arrow 2). Such operation may involve decoding or translating a bar code, character recognizing alphanumeric characters, combinations thereof, etc.

After the processing circuitry 222 has ascertained the network address of the client device 24, the display equipment 26 sends a message to the client device 24 using the network address (arrow 3). The message contains the network address of the display equipment 26 to enable the client device 24 to send communications back to the display equipment 26 and construct of a full-duplex network connection.

Once the client device 24 receives the message from the display equipment 26, the client device 24 and the display equipment 26 create a communications pathways (arrow 4) through which the client device 24 and the display equipment 26 can continue to exchange electronic signals during casting of the virtual desktop. In some arrangements, the client device 24 may be running a web socket server that initially listens on a particular port, and ultimately creates a websocket connection between the client device 24 and the display equipment 26.

It should be understood that other techniques are suitable for establishing the connection. For example, the client device 24 and the display equipment 26 can perform Bluetooth discovery, exchange RF signals, etc. The user may manually enter network addresses into a GUI. Alternatively, the display equipment 26 can display an image which is captured by a camera of the client device 24, and so on. Further details will now be provided with reference to FIG. 5.

Figure 5:
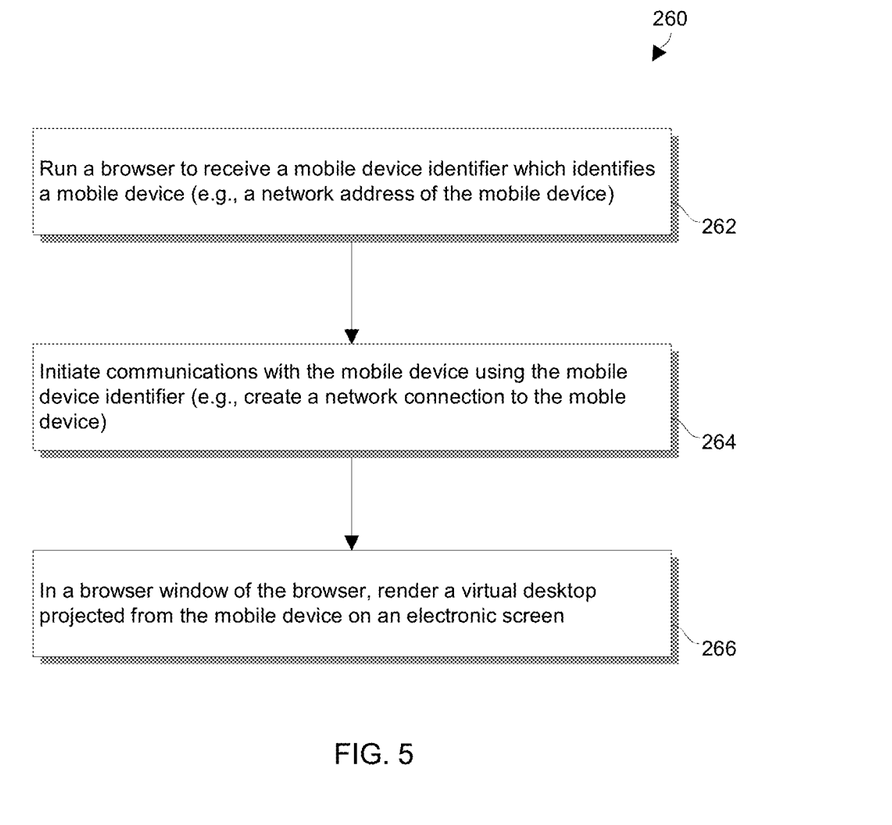
FIG. 5 is a flowchart of a procedure that is performed by the computing environment of FIG. 1 in accordance with certain embodiments.

FIG. 5 is a flowchart of a procedure 260 for providing a virtual desktop in accordance with certain embodiments. The procedure 260 may be performed by smart display equipment.

At 262, the smart display equipment runs a browser to receive a mobile device identifier that identifies a mobile device. In some arrangements, the mobile device identifier is a network address of the mobile device.

At 264, the smart display equipment initiates communications with the mobile device using the mobile device identifier. Here, the smart display equipment creates a network connection with the mobile device.

At 266, the smart display equipment renders, in a browser window of the browser, a virtual desktop projected from the mobile device on an electronic screen of the smart display equipment. Accordingly, the user is now able to enjoy the virtual desktop from the smart display equipment.

Figure 6:
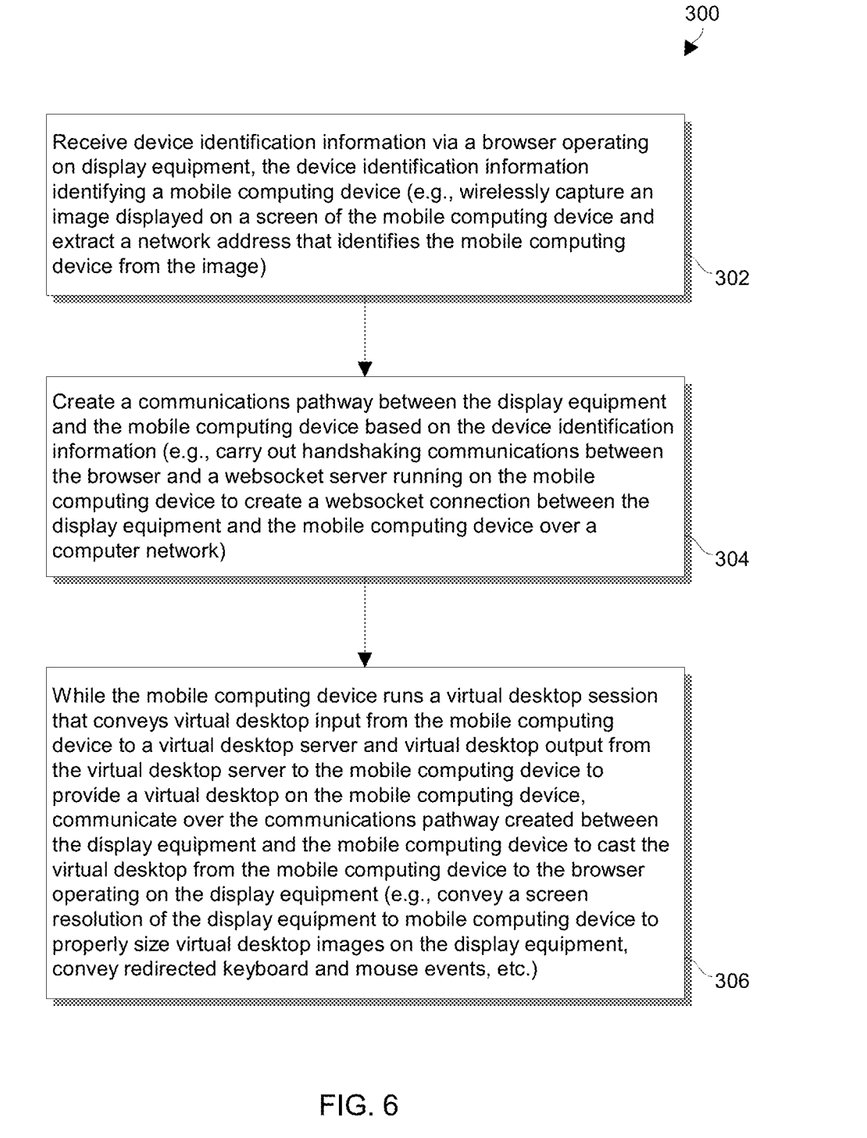
FIG. 6 is flowchart of a detailed procedure that is performed by display equipment of FIG. 1 in accordance with certain embodiments.

FIG. 6 is a flowchart of a detailed procedure 300 for providing a virtual desktop in accordance with certain embodiments. Such a procedure 300 may be performed by smart display equipment and impose little to no burden on the user.

At 302, the display equipment 26 receives device identification information via a browser operating on display equipment, the device identification information identifying a virtual desktop client device such as a mobile computing device. As mentioned earlier, in some arrangements, a camera of the display equipment captures an image displayed on the screen of the virtual desktop client device and extracts/decodes a network address that identifies the virtual desktop client device from the image (also see arrow 1 in FIG. 4).

At 304, the display equipment 26 creates a communications pathway between the display equipment and the virtual desktop client device based on the device identification information. In some arrangements, the display equipment 26 sends a message to the virtual desktop client device over a computer network (also see the communications medium 32 in FIG. 1). The virtual desktop client device runs a websocket server which listens on a particular port number for the message and, upon receipt of the message, is able to respond thus providing full-duplex communications through the computer network. Such handshaking communications results in formation of a websocket connection through which the virtual desktop client device and the display equipment can continue to communicate.

At 306, while the virtual desktop client device runs a virtual desktop session that conveys virtual desktop input from the virtual desktop client device to a virtual desktop server and virtual desktop output from the virtual desktop server to the virtual desktop client device to provide a virtual desktop on the virtual desktop client device, the virtual desktop client device and the display equipment continue to communicate over the communications pathway created between the display equipment and the virtual desktop client device to cast the virtual desktop from the virtual desktop client device to the browser operating on the display equipment. Such communications includes the display equipment providing the screen resolution of the display equipment to the virtual desktop client device for conveyance to the virtual desktop server that hosts the virtual desktop to enable the virtual desktop server to output a virtual desktop graphics stream containing virtual desktop images that are properly sized for display by the display equipment.

In some arrangements, the display equipment captures and redirects keyboard and mouse events to the virtual desktop client device. The virtual desktop client device then provides the keyboard and mouse events as virtual desktop input to the virtual desktop server to operate the virtual desktop. Accordingly, the virtual desktop graphics stream from the virtual desktop server may include different virtual desktop images indicating virtual desktop activity in response to the keyboard and mouse events (e.g., accessing email on the virtual desktop, editing a document on the virtual desktop, accessing a website using a web browser on the virtual desktop, etc.).

As described above, improved techniques are directed to providing a virtual desktop on display equipment 26 (e.g., a desktop computer, a smart television, a smart projection system for a conference room, etc.) which runs a browser that loads a set of specialized web pages. When the set of specialized web pages is loaded, the display equipment 26 creates a communications channel with a client device 24 that has already launched a virtual desktop (e.g., a tablet, a smart phone, a laptop, etc.). The display equipment 26 and the client device 24 coordinate their operation through the communications channel to enable that virtual desktop to be "casted" to the display equipment 26 from the client device 24. Such operation enables user input such as keyboard events and physical mouse events occurring on the display equipment 26 to be redirected as input to the virtual desktop launched on the client device 24, and for a virtual desktop graphics stream to be conveyed to the display equipment 26 from the client device 24 for display by the display equipment 26. Furthermore, the client device 24 can communicate the resolution of the screen of the display equipment 26 to the virtual desktop server equipment 22 that hosts the virtual desktop so that the virtual desktop graphics stream is sized for proper display by the display equipment 26.

One should appreciate that the above-described techniques amount to more than simply performing routine tasks using a computer. Rather, the techniques involve an improvement to the technology of managing and/or applying computerized resources to efficiently and effectively support one or more users. For example, a mobile phone may have a tiny touchscreen which is difficult for a user to use. However, with certain improvements disclosed herein, a virtual desktop on the mobile phone can be casted to display equipment that has better resources (e.g., a larger screen, a keyboard, a mouse, etc.). Accordingly, the user is able to see more information, operate GUIs that provide more detail (e.g., more screen space to display more information, deeper menus, higher resolution graphics, etc.), and so on. Moreover, there risk of confidential information leakage is low since exposure of certain sensitive information such as a user's password can be contained/isolated to the mobile phone prior to casting.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computing environment 20 such as the virtual desktop server equipment 22 and the web server device 28 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

It should be understood that some of the improvements disclosed herein provide for a cross-platform solution that extends the display of a mobile device to improve the user experience of mobile working in virtual desktop scenarios. The solution transfers the graphics stream of a virtual desktop from the mobile device to a web browser and renders images dynamically in an HTML5 web page. Such a solution may make casting independent of underlying operating system and significantly reduces the effort of development.

In some arrangements, the graphic stream is decoded and rendered in a set of HTML5 web pages, which means there is no need to pre-install any decoding and rendering software on the display platform. Moreover, this scenario may work universally regardless of the operating system and underlying hardware without additional effort.

In some arrangements, the graphics stream is obtained from a virtual desktop (e.g., Windows desktop or Linux Desktop) on a mobile device. Currently, both Windows desktop and Linux desktop may be more suitable for extended screens than mobile touchscreens.

In some arrangements, the solution brings both convenience and security to mobile working. When virtual desktop is casted to an extended screen, the virtual desktop session is still running on the mobile device. Accordingly, the user can carry the mobile device out of the office and work with any public display the user can find without worrying data and personal information leak.

In common mobile working scenarios, screen size is usually a limitation and brings inconvenience to the user. Some earlier casting attempts have limitations such as:

The virtual desktop that is casted did not fit the resolution of the external screen.

Mobile applications are designed to work with touching screen instead of physical keyboard and mouse. Accordingly, the mobile applications don't work well when users switch to physical keyboard and mouse.

Some casting attempts require pre-installation and configuration of specialized software making such casting unavailable or impractical for general computing devices in public settings.

However, in accordance with certain embodiments disclosed herein, there is a new solution to cast a virtual desktop to an external screen and render the virtual desktop in an HTML5 web page. This solution doesn't require users to purchase specific hardware and deploy software. Rather, this solution enables users to cast their virtual desktops to external screens in any place they have a computer and screen. Along these lines, the Windows and Linux desktops can work well with external screens, physical mouse and keyboard, etc.

In some arrangements, a web server hosts a website on which a rendering web page is available. The web server can be accessed through a public network. The browser that loads the rendering web page supports HTML5 and runs on any universal operating system, such as Windows, Linux and so on. The browser can access HTML5 web pages hosted on web server. Furthermore, the virtual desktop client device is the mobile working device by operated by a user. Here, the mobile working device can access a virtual desktop host which may be in the user's enterprise network or in the cloud. Accordingly, the user can launch the virtual desktop on the mobile working device.

Next, the user directs the display equipment to load a web page having a discovery script that discovers the phone. There are several discovery methods that can be used. For example, the mobile working device works as a websocket server and listens on a specific port. After the discovery script obtains the address of the mobile working device, the display equipment connects to the mobile working device via the websocket. Once the display equipment and the mobile working device are connected, the display equipment sends the resolution of its screen to the mobile working device. Upon receipt of the resolution, the mobile working device requests a new resolution for the virtual desktop to the virtual desktop server hosting the virtual desktop. In response, the virtual desktop server provides the graphics stream in the new resolution. The mobile working device conveys the graphics screen to the display equipment and the display equipment decodes the graphic stream and renders virtual desktop images in the web page.

Other mobile working device discovery methods are suitable for use as well. For example, the user can manually enter the IP address of the mobile working device into the display equipment. Alternatively, the mobile working device can capture an image displayed by the mobile working device and decode the image to obtain the address. Other discovery techniques are suitable for use as well such as Bluetooth, NFC, and so on.

Additionally, it should be understood that the solution supports keyboard and mouse redirection to enable users to use a physical keyboard and a mouse after the virtual desktop is casted to the extended screen. In particular, the rendering HTML5 web page captures keyboard/mouse events and sends them to mobile working device. The mobile working device does not handle these events but transfers them to the virtual desktop server that hosts the virtual desktop. That is, the virtual desktop server processes the keyboard and mouse events so that it appears that the keyboard and mouse are working in the virtual desktop even though the mobile working device desktop is being rendered in the browser.

It should be understood that the sequence diagram 100 in FIG. 3 described the display equipment 26 as loading a first web page for virtual desktop client discovery, and a second web page for rendering the virtual desktop. Furthermore, the resolution of the screen of the display equipment 26 was described as being conveyed by the second web page. Other exchanges are suitable as well. For example, the resolution of the screen of the display equipment 26 may be conveyed by the browser running the second web page. Such modifications and enhancements are intended to belong to various embodiments of the disclosure.

What is claimed is:

1. A method of providing a virtual desktop, the method comprising:
   receiving device identification information via a browser operating on display equipment, the device identification information identifying a mobile computing device;
   based on the device identification information, creating a communications pathway between the display equipment and the mobile computing device; and
   while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment;
   wherein receiving the device identification information via the browser operating on the display equipment includes:
      loading a first web page that includes a discovery script, and
      running the discovery script to obtain the device identification information identifying the mobile computing device;
   wherein the device identification information includes a network address that uniquely identifies the mobile computing device on a computer network; and
   wherein running the discovery script to obtain the device identification information identifying the mobile computing device includes:
      capturing an image displayed on a touchscreen of the mobile computing device using a camera of the display equipment, and
      deriving the network address from the captured image displayed on the touchscreen of the mobile computing device.

2. The method as in claim 1 wherein the display equipment includes an electronic screen and control circuitry that runs the browser to display a browser window on the electronic screen; and
   wherein communicating over the communications pathway created between the display equipment and the mobile computing device includes:
      receiving a virtual desktop graphics stream from the mobile computing device and rendering the virtual desktop graphics stream within the browser window displayed on the electronic screen.

3. The method as in claim 2 wherein the display equipment further includes:
   a keyboard and a physical mouse coupled to the control circuitry; and
   wherein communicating over the communications pathway created between the display equipment and the mobile computing device further includes:
      sending keyboard events and mouse events captured by the control circuitry that runs the browser from the display equipment to the mobile computing device over the communications pathway.

4. The method as in claim 3 wherein receiving the virtual desktop graphics stream from the mobile computing device and rendering the virtual desktop graphics stream within the browser window displayed on the electronic screen includes:
   while the keyboard events and mouse events are sent by the control circuitry, displaying different desktop images within the browser window on the electronic screen to depict operation of the virtual desktop in response to the mobile computing device conveying the keyboard events and mouse events to the virtual desktop server.

5. The method as in claim 4, further comprising:
   sending a screen resolution for the electronic screen of the display equipment from the display equipment to the mobile computing device for conveyance to the virtual desktop server to enable the virtual desktop server to match a resolution of the different desktop images to the screen resolution for the electronic screen of the display equipment.

6. The method as in claim 5 wherein the touchscreen of the mobile computing device has a touchscreen resolution;
   wherein prior to sending the screen resolution for the electronic screen of the display equipment, the virtual desktop server provides a first set of desktop images having the touchscreen resolution; and
   wherein sending the screen resolution for the electronic screen of the display equipment includes causing the virtual desktop server to provide a second set of desktop images having the screen resolution different from that of the first set of desktop images.

7. The method as in claim 3 wherein sending the keyboard events and the mouse events captured by the control circuitry that runs the browser from the display equipment to the mobile computing device over the communications pathway includes:
   redirecting keyboard events and mouse events which are detected within the browser window to the mobile computing device.

8. The method as in claim 7 wherein receiving the virtual desktop graphics stream from the mobile computing device and rendering the virtual desktop graphics stream within the browser window displayed on the electronic screen includes:
   displaying user activity within the browser window while the keyboard events and the mouse events which are detected within the browser window are redirected to the mobile computing device.

9. The method as in claim 2, further comprising:
   loading, in response to creating the communications pathway between the display equipment and the mobile computing device, a second web page in place of the first web page, the second web page including a rendering script.

10. The method as in claim 9 wherein receiving the virtual desktop graphics stream from the mobile computing device and rendering the virtual desktop graphics stream within the browser window displayed on the electronic screen includes:

in accordance with the rendering script of the second web page, displaying different desktop images generated by the virtual desktop server in the browser window displayed on the electronic screen.

11. The method as in claim 10 wherein displaying the different desktop images generated by the virtual desktop server in the browser window displayed on the electronic screen includes:
decoding the virtual desktop graphics stream to render the different desktop images within the second web page while the electronic screen of the display equipment is recognized as an extended screen by the mobile computing device.

12. The method as in claim 1 wherein creating the communications pathway between the display equipment and the mobile computing device includes:
performing a websocket operation that enables the browser operating on the display equipment to establish websocket communications between the browser operating on the display equipment and the mobile computing device.

13. Display equipment, comprising:
a communications interface constructed and arranged to connect to a computer network;
memory; and
control circuitry coupled to the communications interface and the memory, the control circuitry configured to:
receive device identification information via a browser operating on the display equipment, the device identification information identifying a mobile computing device;
based on the device identification information, creating a communications pathway between the display equipment and the mobile computing device through the communications interface; and
while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment;
wherein the control circuitry when receiving the device identification information via the browser operating on the display equipment, is constructed and arranged to:
load a first web page that includes a discovery script, and
run the discovery script to obtain the device identification information identifying the mobile computing device;
wherein the device identification information includes a network address that uniquely identifies the mobile computing device on a computer network; and
wherein the control circuitry, when running the discovery script to obtain the device identification information identifying the mobile computing device, is constructed and arranged to:
capture an image displayed on a touchscreen of the mobile computing device using a camera of the display equipment, and
derive the network address from the captured image displayed on the touchscreen of the mobile computing device.

14. The display equipment as in claim 13, further comprising:
an electronic screen, the control circuitry running the browser to display a browser window on the electronic screen; and
wherein the control circuitry, when communicating over the communications pathway created between the display equipment and the mobile computing device, is constructed and arranged to:
receive a virtual desktop graphics stream from the mobile computing device and render the virtual desktop graphics stream within the browser window displayed on the electronic screen.

15. The display equipment as in claim 14 wherein the display equipment further includes:
a keyboard and a physical mouse coupled to the control circuitry; and
wherein the control circuitry, when communicating over the communications pathway created between the display equipment and the mobile computing device, is further constructed and arranged to:
capture keyboard events in response to user operation of the keyboard and mouse events in response to user operation of the physical mouse, and
send the keyboard events and the mouse events over the communications pathway.

16. The display equipment as in claim 13 wherein the control circuitry is further constructed and arranged to:
load, in response to creating the communications pathway between the display equipment and the mobile computing device, a second web page that includes a rendering script.

17. A computer program product having a non-transitory computer readable medium that stores a set of instructions to provide a virtual desktop; the set of instructions, when carried out by display equipment, causing the display equipment to perform a method of:
receiving device identification information via a browser operating on display equipment, the device identification information identifying a mobile computing device;
based on the device identification information, creating a communications pathway between the display equipment and the mobile computing device; and
while the mobile computing device runs a virtual desktop session that conveys virtual desktop input from the mobile computing device to a virtual desktop server and virtual desktop output from the virtual desktop server to the mobile computing device to provide a virtual desktop on the mobile computing device, communicating over the communications pathway created between the display equipment and the mobile computing device to cast the virtual desktop from the mobile computing device to the browser operating on the display equipment;
wherein receiving the device identification information via the browser operating on the display equipment includes:
loading a first web page that includes a discovery script, and
running the discovery script to obtain the device identification information identifying the mobile computing device;
wherein the device identification information includes a network address that uniquely identifies the mobile computing device on a computer network; and wherein running the discovery script to obtain the device identification information identifying the mobile computing device includes:
    capturing an image displayed on a touchscreen of the mobile computing device using a camera of the display equipment, and
    deriving the network address from the captured image displayed on the touchscreen of the mobile computing device.

18. The computer program product as in claim 17 wherein the display equipment includes an electronic screen and control circuitry that runs the browser to display a browser window on the electronic screen, the electronic screen being larger than a touchscreen of the mobile computing device; and
    wherein communicating over the communications pathway created between the display equipment and the mobile computing device includes:
        receiving a virtual desktop graphics stream from the mobile computing device and rendering the virtual desktop graphics stream within the browser window displayed on the electronic screen.

19. The computer program product as in claim 18 wherein the display equipment further includes:
    a keyboard and a physical mouse coupled to the control circuitry; and
    wherein communicating over the communications pathway created between the display equipment and the mobile computing device further includes:
        sending keyboard events and mouse events captured by the control circuitry that runs the browser from the display equipment to the mobile computing device over the communications pathway.

20. The computer program product as in claim 17 wherein the method further comprises:
    loading, in response to creating the communications pathway between the display equipment and the mobile computing device, a second web page in place of the first web page, the second web page including a rendering script.

* * * * *